US005629588A

United States Patent [19]
Oda et al.

[11] Patent Number: 5,629,588
[45] Date of Patent: May 13, 1997

[54] LIGHTING CIRCUIT UTILIZING DC POWER FOR A DISCHARGE LAMP UTILIZING AC POWER

[75] Inventors: Goichi Oda; Atsushi Toda; Masayasu Yamashita, all of Shimizu, Japan

[73] Assignee: Koito Manufacturing Co., Ltd., Tokyo, Japan

[21] Appl. No.: 525,176

[22] Filed: Sep. 8, 1995

[30] Foreign Application Priority Data

Sep. 8, 1994 [JP] Japan ................................. 6-239665

[51] Int. Cl.⁶ ........................................................ G05F 1/00
[52] U.S. Cl. ............................ 315/308; 315/307; 315/291; 315/DIG. 7; 315/119
[58] Field of Search ................................ 315/77, 82, 83, 315/119, 127, 224, 225, 291, 307, 308, DIG. 7

[56] References Cited

U.S. PATENT DOCUMENTS

| | | | |
|---|---|---|---|
| 4,240,009 | 12/1980 | Paul | 315/224 |
| 4,724,360 | 2/1988 | Luursema | 315/244 |
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,198,728 | 3/1993 | Bernitz et al. | 315/307 |
| 5,212,428 | 5/1993 | Sasaki et al. | 315/308 |
| 5,278,452 | 1/1994 | Matsumoto et al. | 307/10.8 |
| 5,295,036 | 3/1994 | Yagi et al. | 361/79 |
| 5,449,973 | 9/1995 | Yamashita et al. | 315/82 |
| 5,485,059 | 1/1996 | Yamashita et al. | 315/307 |

FOREIGN PATENT DOCUMENTS

| | | |
|---|---|---|
| 4129557 | 3/1992 | Germany. |
| 4134537 | 4/1992 | Germany. |
| 4117589 | 12/1992 | Germany. |
| 4322139 | 1/1994 | Germany. |
| 4330615 | 5/1994 | Germany. |

Primary Examiner—Robert Pascal
Assistant Examiner—Haissa Philogene
Attorney, Agent, or Firm—Sughrue, Mion, Zinn, Macpeak & Seas

[57] ABSTRACT

A lighting circuit converts the output voltage of a DC booster circuit to an AC voltage which is in turn supplied to a discharge lamp connected between AC output terminals. The lighting circuit comprises a short-circuit detector for detecting a change of a DC voltage from the DC booster circuit to a square-wave voltage when short-circuiting between one of the AC output terminals and ground occurs, and sends a detection signal via a hold circuit to a power cutoff relay circuit. As a result, a relay contact in the power cutoff relay circuit is opened to inhibit the operation of the lighting circuit.

19 Claims, 9 Drawing Sheets

LIGHTING CIRCUIT UTILIZING DC POWER FOR A DISCHARGE LAMP UTILIZING AC POWER

BACKGROUND OF THE INVENTION

1. Field of the Invention

The present invention relates to an improved and novel lighting circuit for a discharge lamp, which detects the short-circuit state between the ground and AC output terminals where a discharge lamp is connected and stops the operation of the lighting circuit, thereby protecting the lighting circuit and preventing an electric shock.

2. Description of the Related Art

Recently, compact metal halide lamps are receiving greater attention as a light source to take the place of an incandescent lamp. A known lighting circuit for a vehicular metal halide lamp is designed to use a DC power supply for a power source in such a way that a DC input voltage after being boosted by a DC booster circuit is converted to an AC voltage with a sine waveform or a square waveform which is in turn applied to the metal halide lamp.

FIG. 8 shows one example of such a lighting circuit shown by a. A DC voltage from a battery b is input to a DC booster circuit e via a lighting switch c and a protection circuit d and is then converted to an AC voltage by a DC-AC converter f.

An igniter circuit g, provided at the subsequent stage of the DC-AC converter f, generates a high-voltage pulse when a metal halide lamp h is activated, and super-imposes this pulse on the output voltage of the DC-AC converter f. The igniter circuit g then applies the resultant voltage to the metal halide lamp h. The metal halide lamp h is connected to AC output terminals i and i'.

A short-circuit detector j detects the output voltage of the DC-AC converter f to detect the occurrence of a short-circuit state due to the disconnection of a connector, water penetration or the like. This detector j sends a detection signal to the protection circuit d to stop the operation of the lighting circuit to cut off the power supply to the metal halide lamp g.

In detecting short-circuiting, the following three short-circuit states should be considered.

(1) Short-circuit between the AC output terminals i and i'.
(2) Short-circuit between the AC output terminal i and ground.
(3) Short-circuit between the AC output terminal i' and ground.

FIG. 9 exemplifies the structure of the short-circuit detector j which has three comparators.

A comparator k detects the event (1) or (2). This comparator k has one input terminal connected to the line that connects one output terminal of the DC-AC converter f to one AC output terminal i, with a reference voltage from a constant voltage supply l being supplied to the other input terminal. The comparator k outputs a high (H) signal when the potential at the AC output terminal i becomes equal to or lower than the reference voltage.

A comparator m detects the event (1) or (3). This comparator m has one input terminal connected to the line that connects one output terminal of the DC-AC converter f to one AC output terminal i', with a reference voltage from a constant voltage supply n being supplied to the other input terminal. The comparator m outputs an H-level signal when the potential at the AC output terminal i' becomes equal to or lower than the reference voltage.

A comparator o has one input terminal connected to one output terminal of the DC-AC converter f and the other input terminal connected to the other output terminal of the DC-AC converter f. The comparator o compares the potentials at the AC output terminals i and i' with each other and outputs an H-level signal as the detection output for the event (2).

The output terminals of those comparators k, m and o are connected via diodes in an OR form to be connected to the input terminal of a hold circuit p in the protection circuit d.

The short-circuit detector j detects the event (1) when the outputs of the comparators k and m both have an H level, detects the event (2) when the output of the comparator o has an H level, and detects the event (3) when the output of the comparator m has an H level. Those detection signals work on the protection circuit d via the hold circuit p to inhibit the operation of a lighting circuit a. This inhibited state is maintained until a lighting switch c is activated again.

The above conventional lighting circuit requires three comparators to detect short-circuiting, and particularly uses two comparators to respectively detect the short-circuit states (2) and (3). This design has a complicated circuit structure and suffers an increased number of elements.

SUMMARY OF THE INVENTION

Accordingly, it is an object of the present invention to provide a lighting circuit for a discharge lamp, which detects the short-circuit state between the ground and AC output terminals where a discharge lamp is connected and stops the operation of the lighting circuit, thereby protecting the lighting circuit and preventing an electric shock and simplifying the circuit structure.

To achieve the above object, there is provided a lighting circuit according to this invention comprising a DC power supply circuit for boosting and/or decreasing a DC voltage; a DC-AC converter for converting an output voltage of the DC power supply circuit into a square-wave AC voltage and supplying the AC voltage to a discharge lamp; an abnormality detector for monitoring an output voltage of a DC booster circuit in the DC power supply circuit and an output voltage of the DC-AC converter to thereby detect an abnormality of the lighting circuit; and a protection circuit for inhibiting an operation of the lighting circuit or cutting off power supply to the discharge lamp when an abnormality is detected by the abnormality detector.

The abnormality detector may include a short-circuit detecting circuit for detecting a change of a DC voltage from the DC booster circuit to a square-wave voltage when short-circuiting between an AC output terminal and ground occurs, and the protection circuit inhibits the operation of the lighting circuit or cutting off power supply to the discharge lamp when short-circuiting between the AC output terminal and ground is detected by the short-circuit detecting circuit.

According to this invention, the short-circuit detecting circuit detects that the DC voltage output from the DC power supply circuit changes to a square-wave voltage when short-circuiting occurs between one of the two AC output terminals and the ground, and the protection circuit can inhibit the operation of the lighting circuit upon detection of short-circuiting. This structure does not therefore require special detectors to detect the events (2) and (3).

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings.

FIGS. 1 through 4 illustrate a lighting circuit for a discharge lamp according to a first embodiment of the present invention in which FIG. 1 is a block diagram showing the outline of the lighting circuit;

FIG. 2 is a diagram schematically showing the structure of a DC-AC converter;

FIG. 3 is a circuit diagram showing an example of the structure of a second short-circuit detector; and FIG. 4 is a circuit diagram exemplifying the structures of a power cutoff relay circuit and a hold circuit.

FIGS. 5 through 7 illustrate a lighting circuit for a discharge lamp according to a second embodiment of the present invention in which FIG. 5 is a block diagram showing the outline of this lighting circuit;

FIG. 6 is a circuit diagram showing an example of the structure of a second short-circuit detector: and FIG. 7 is a diagram exemplifying the structure of a constant voltage supply section.

DETAILED DESCRIPTION OF THE PREFERRED EMBODIMENTS

Lighting circuits for a discharge lamp according to preferred embodiments of the present invention will now be described in detail with reference to the accompanying drawings. In the illustrated embodiments, this invention is adapted for a lighting circuit for a vehicular discharge lamp.

FIGS. 1 through 4 illustrate the first embodiment.

Figure 1:
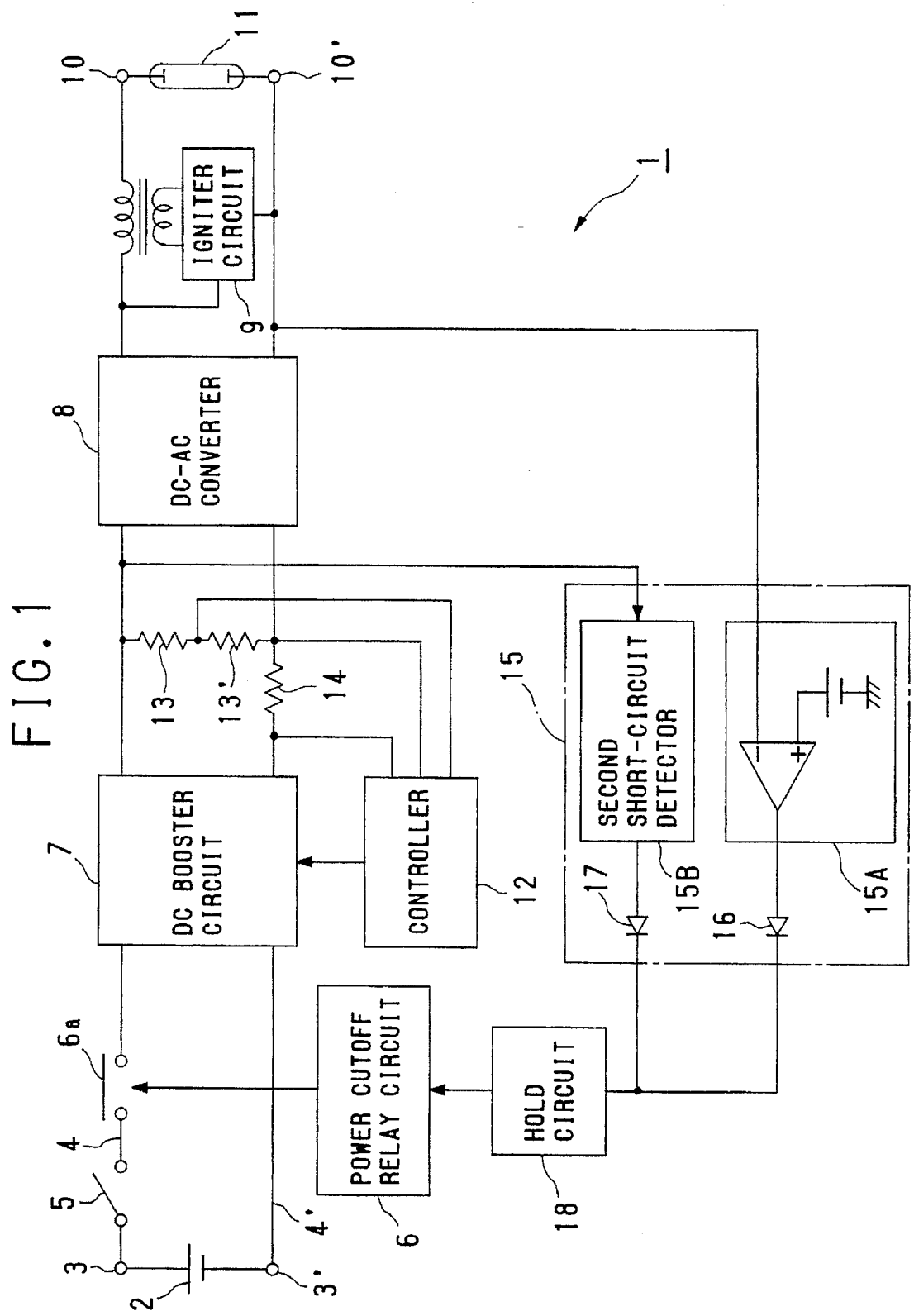

FIG. 1 shows the outline of a lighting circuit 1. The lighting circuit 1 has a battery 2, connected between DC voltage input terminals 3 and 3'. There are two DC power lines 4 and 4', and a lighting switch 5 is provided on the positive DC power line 4.

A relay contact 6a is provided on the positive power line 4, and is opened and closed by a power cutoff relay circuit 6. That is, the power cutoff relay circuit 6 serves as a protection circuit to cut off the supply of a battery voltage to circuits at the subsequent stages when abnormality in the lighting circuit 1 is detected.

A DC booster circuit 7 has its positive input terminal connected to the output terminal of the relay contact 6a and the other, ground input terminal connected to the DC voltage input terminal 3'. The DC booster circuit 7 serves to boost the battery voltage under the control of a controller which will be described in detail later. For example, the DC booster circuit 7 has the structure of a fly-back type DC-DC converter. Although the DC booster circuit 7 is designed to only boost the battery voltage, it may be designed to execute both voltage boosting and dropping depending on the value of the battery voltage.

A DC/AC converter 8 is provided at the subsequent stage of the DC booster circuit 7 to convert the DC voltage from the booster circuit 7 into an AC voltage of a square waveform. A bridge type driving circuit using two pairs of semiconductor switching elements is used for this DC/AC converter 8.

An igniter circuit 9 is provided at the subsequent stage of the DC/AC converter 8. A metal halide lamp 11 having rated power of 35 W is connected between AC output terminals 10 and 10' of the igniter circuit 9.

A controller 12 serves to control the output voltage of the DC booster circuit 7. The controller 12 receives a voltage detection signal corresponding to the output voltage of the DC booster circuit 7 which is detected by voltage-dividing resistors 13 and 13' provided between the output terminals of the DC booster circuit 7. The controller 12 also receives a current detection signal, which corresponds to the output current of the DC booster circuit 7 converted into a voltage form by a current-detecting resistor 14, provided on the ground line that connects the DC booster circuit 7 to the DC-AC converter 8.

The controller 12 generates control signals according to these detection signals, and sends the control signals to the DC booster circuit 7 to control the output voltage of the circuit 7, thereby performing power control matching the status of the metal halide lamp 11 at the time of activation. This power control can shorten the activation time and the re-activation time of the lamp.

An abnormality detector 15 constantly monitors the output voltage and the like of the DC/AC converter 8 to detect an abnormality of the circuit, thereby protecting the circuit and preventing abnormality-originated accidents.

The abnormality detector 15 includes short-circuit detectors 15A and 15B which detect the aforementioned short-circuit states (1) to (3). More specifically, the first short-circuit detector 15A detects (1) short-circuiting between the AC output terminals 10 and 10', and the second short-circuit detector 15B detects (2) short-circuiting between the AC output terminal 10 and the ground, and (3) short-circuiting between the AC output terminal 10' and the ground.

If power supply to the lamp continues under those conditions, heat may be generated from the circuit and around that circuit, causing a fire or electric-shock oriented accidents to occur. To prevent such an accident, short-circuit detection signals from the first and second short-circuit detectors 15A and 15B are sent via respective diodes 16 and 17 to a hold circuit 18, which in turn sends its output signal to the power cutoff relay circuit 6 to open the relay contact 6a. As a result, the operation of the lighting circuit 1 is inhibited and the power supply to the metal halide lamp 11 is blocked. The hold circuit 18 serves to hold the operation-inhibiting state until the lighting switch 5 is re-activated.

The first short-circuit detector 15A detects short-circuiting between the AC output terminals 10 and 10' by detecting the output voltage of the DC-AC converter 8. This detector 15A compares the potential at the AC output terminal 10 or 10' with a reference value, and outputs an H-level signal when the detected potential is less than the reference value. In activating the metal halide lamp 11 from the cold state, the lamp voltage is low at the initial stage of the lighting and rises to stay at a constant value as time passes. When the short-circuiting (1) occurs, however, the potential at the AC output terminal 10 or 10' becomes nearly zero, so that it is possible to determine if short-circuiting has occurred by comparing the detected voltage with the reference voltage.

The second short-circuit detector 15B detects short-circuiting between the AC output terminal 10 or 10' and the ground by detecting the output voltage of the DC booster circuit 7. In other words, this detector 15B executes the detection by utilizing the fact that the output voltage of the DC booster circuit 7 changes from a DC voltage to a square-wave voltage when short-circuiting occurs between the AC output terminal 10 or 10' and the ground.

Figure 2:
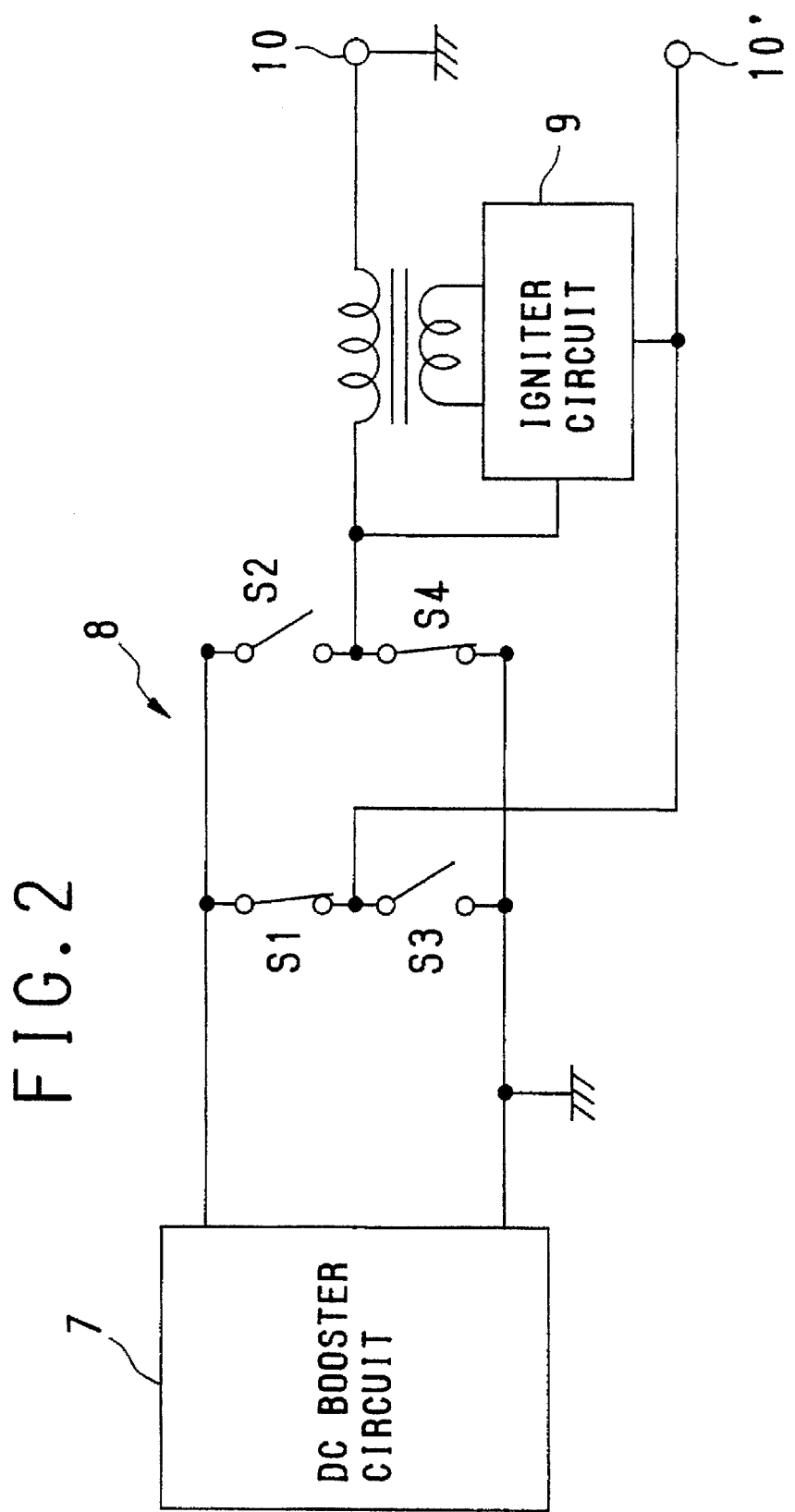

As shown in FIG. 2, the DC-AC converter 8 has a bridge structure comprising semiconductor switching elements S1 to S4 (indicated by switch symbols in the diagram). A series circuit of switching elements S1 and S3 is connected in parallel to a series circuit of switching elements S2 and S4, whereby the output voltage is acquired from between the node between the switching elements S1 and S4 and the node between the switching elements S2 and S3. A pair of switching elements S1 and S3 and a pair of switching elements S2 and S4 are reciprocally switched by signals from a drive controller (not shown).

Assuming that short-circuiting has occurred between the AC output terminal 10 and the ground as illustrated, when the switching elements S1 and S4 are on and the switching elements S2 and S3 are off, the output stage of the DC booster circuit 7 is open as apparent from the path from the switching element S1 to the AC output terminal 10' so that no current flows. When the switching elements S2 and S3 are on and the switching elements S1 and S4 are off, the output stage of the DC booster circuit 7 is short-circuited as apparent from the path from the switching element S2 to the AC output terminal 10. In other words, the output stage of the DC booster circuit 7 alternately repeats the open state and short-circuit state. Since the DC booster circuit 7 is fundamentally controlled to accomplish steady-power control, the input voltage is boosted to the pre-set maximum voltage value when the output stage is open, and the output voltage becomes almost zero when the output stage is short-circuited. As those two states are alternately repeated, a square-wave output is produced. It is also apparent that if the relationship between the switching elements and the AC output terminals is reversed, the output voltage of the DC booster circuit 7 has a square waveform even when short-circuiting occurs between the AC output terminal 10' and the ground.

The aforementioned short-circuit (2) or (3) can be detected by detecting the change of the output voltage of the DC booster circuit 7 from a DC form to a square wave.

Figure 3:
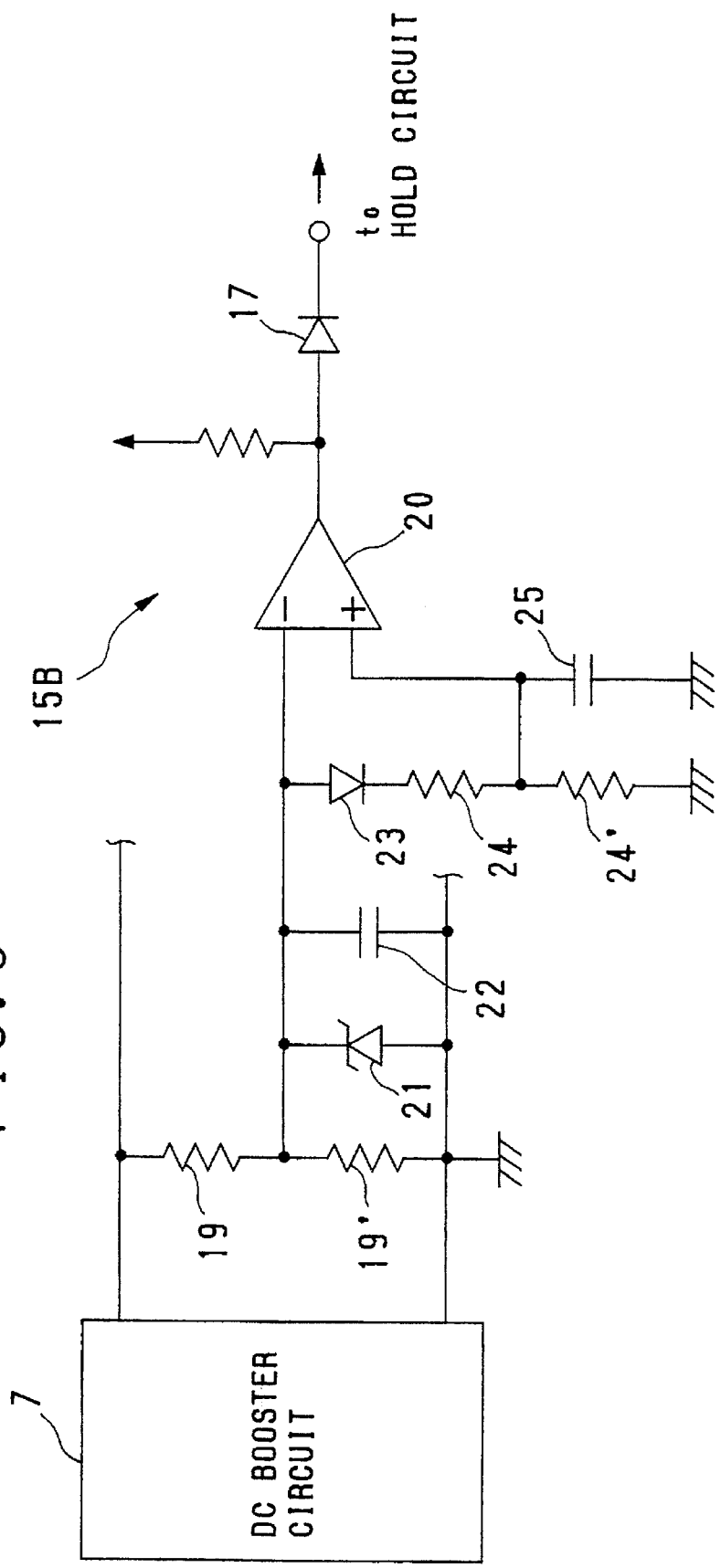

FIG. 3 exemplifies the structure of the second short-circuit detector 15B which is designed to supply the voltage, obtained by dividing the output voltage of the DC booster circuit 7, to one input terminal of a comparator and supply the voltage obtained by smoothing the divided voltage by a capacitor, to the other input terminal of the comparator to thereby obtain a binary signal.

The output voltage of the DC booster circuit 7 is divided by resistors 19 and 19', and the resultant voltage is input to the negative input terminal of a comparator 20. A Zener diode 21 and a capacitor 22 are connected in parallel to the resistor 19'. The negative input terminal of the comparator 20 is connected to the anode of a diode 23 whose cathode is grounded via resistors 24 and 24'. The terminal voltage of a capacitor 25 connected in parallel to the resistor 24' is input to the positive input terminal of the comparator 20. The output of the comparator 20 is sent via a diode 17 to the hold circuit 18. A pull-up resistor is connected to the output terminal of the comparator 20.

When short-circuiting occurs between the AC output terminal 10 or 10' and the ground, the output voltage of the DC booster circuit 7 becomes a square wave as mentioned above, so that the output of the comparator 20 in the second short-circuit detector 15B also becomes a square wave. Accordingly, the H-level waveform part of that output activates the hold circuit 18 via the diode 17.

When the DC booster circuit 7 is operating normally and is outputting a DC voltage, the potential at the positive input terminal of the comparator 20 is always lower than the potential at the negative terminal thereof, so that the output of the comparator 20 stays an L level.

Figure 4:
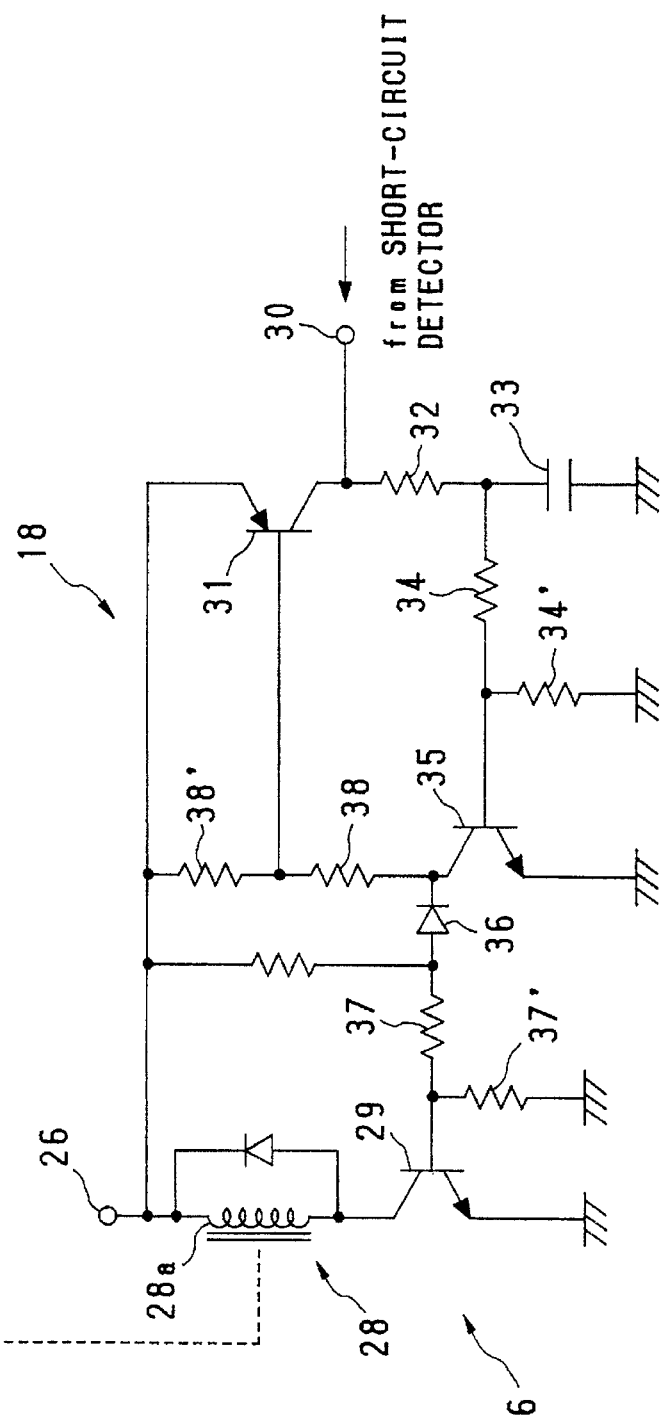

FIG. 4 exemplifies the structures of the power cutoff relay circuit 6 and the hold circuit 18.

A power terminal 26 is connected to the node between the lighting switch 5 and the relay contact 6a via a reverse-voltage preventing diode 27. A relay 28 has a coil 28a, whose one end is connected to the power terminal 26 and whose other end is connected to the collector of an NPN transistor 29. The relay contact 6a is opened or closed in accordance with whether or not the coil 28a is excited.

A signal from the abnormality detector 15 is sent to the input terminal 30 of the hold circuit 18. The hold circuit 18 is designed so that when the potential at the input terminal 30 becomes an H level, this status is held and the transistor 29 is turned off.

As illustrated, an emitter-grounded PNP transistor 31 has its collector grounded via a resistor 32 and a capacitor 33 and connected to the base of an NPN transistor 35 via resistors 32 and 34. The input terminal 30 is connected to the collector of the transistor 31. A resistor 34' is provided between the base and collector of the transistor 35.

The collector of the emitter-grounded NPN transistor 35 is connected via a diode 36 and a resistor 37 to the base of the transistor 29, and is connected via resistors 38 and 38' to the power terminal 26. The node between the resistors 38 and 38' is connected to the base of the PNP transistor 31. A resistor 37' is provided between the base and emitter of the transistor 29.

When an H-level signal is applied to the input terminal 30 of the hold circuit 18 from the first or second short-circuit detector 15A or 15B, the transistors 35 and 31 are turned on and this status is held. As a result, the transistor 29 is turned off.

Consequently, the relay 28 is disabled to open the contact 6a, cutting off the supply of the battery voltage to the DC booster circuit 7. This condition continues until the lighting switch 5 is activated again after being temporarily switched off.

Figure 5:
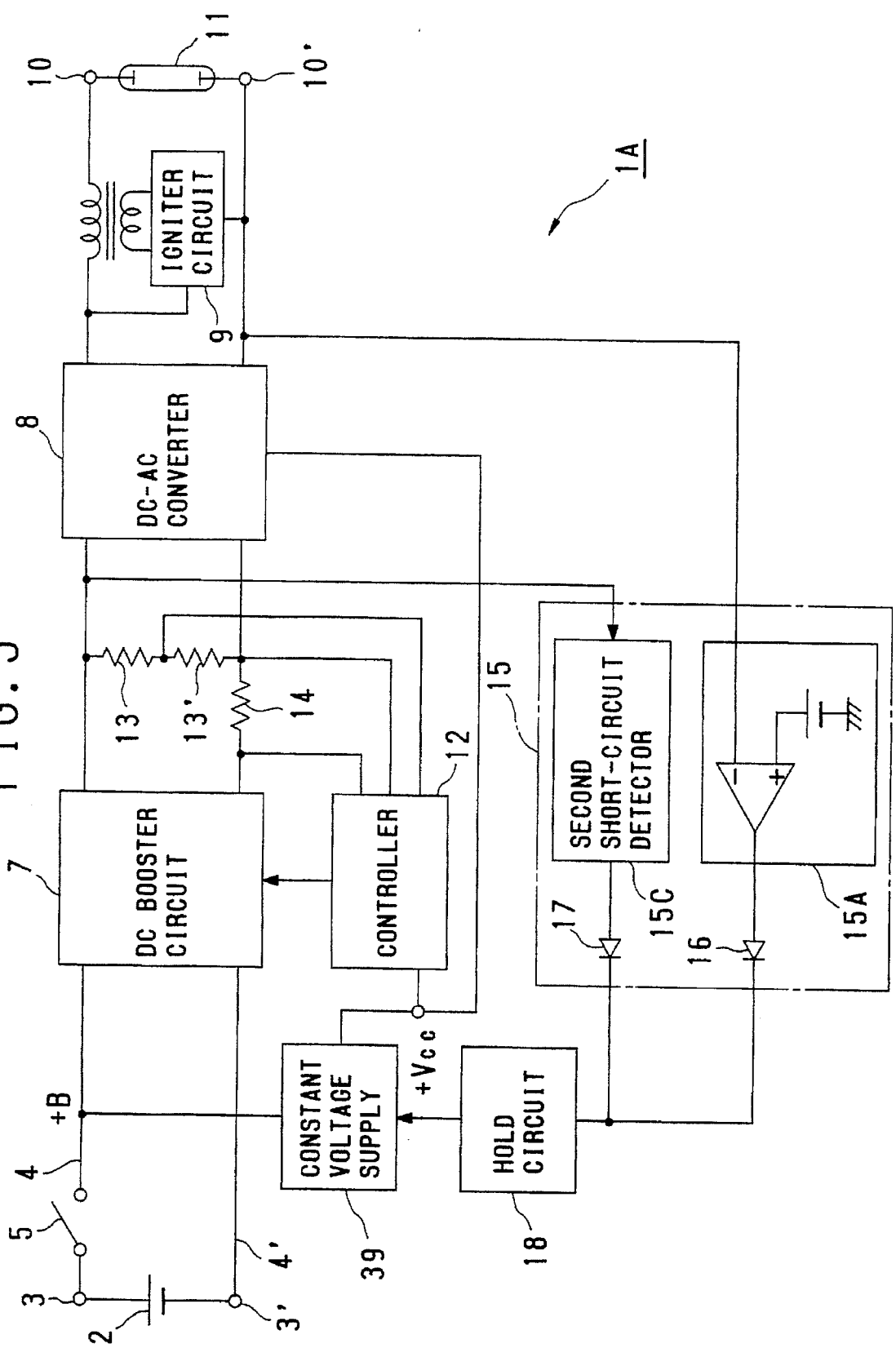
Figure 6:
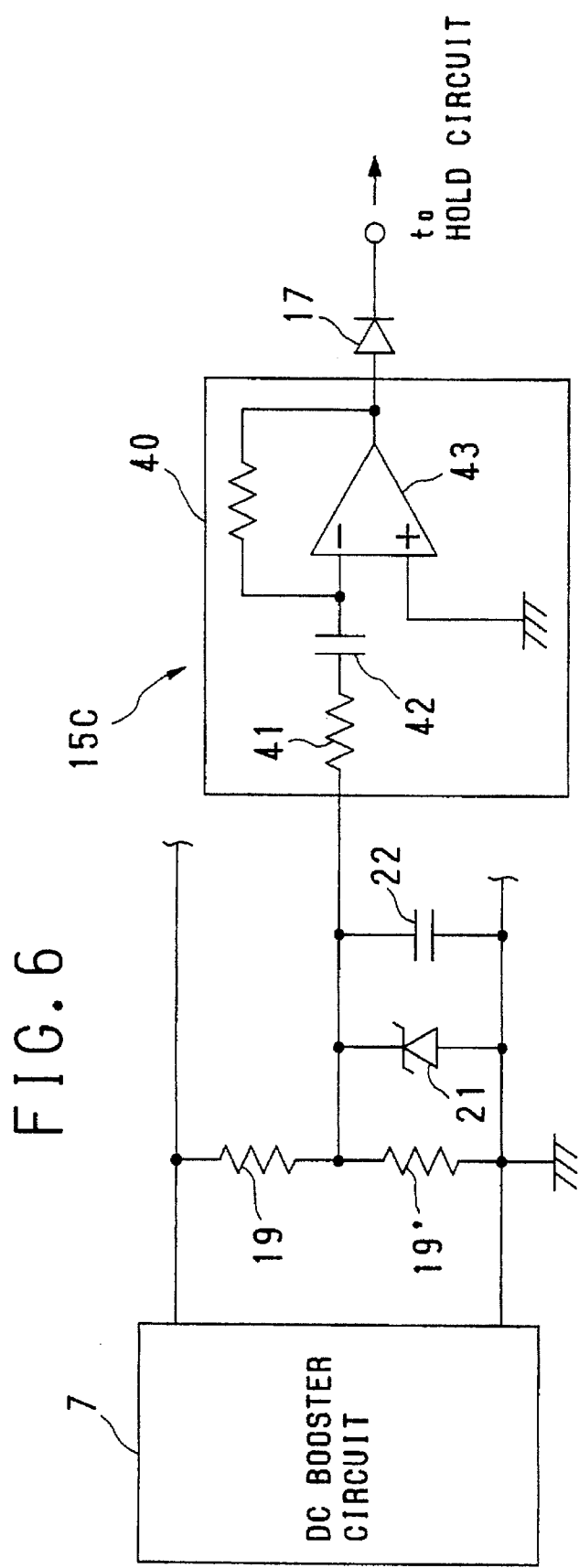
Figure 7:
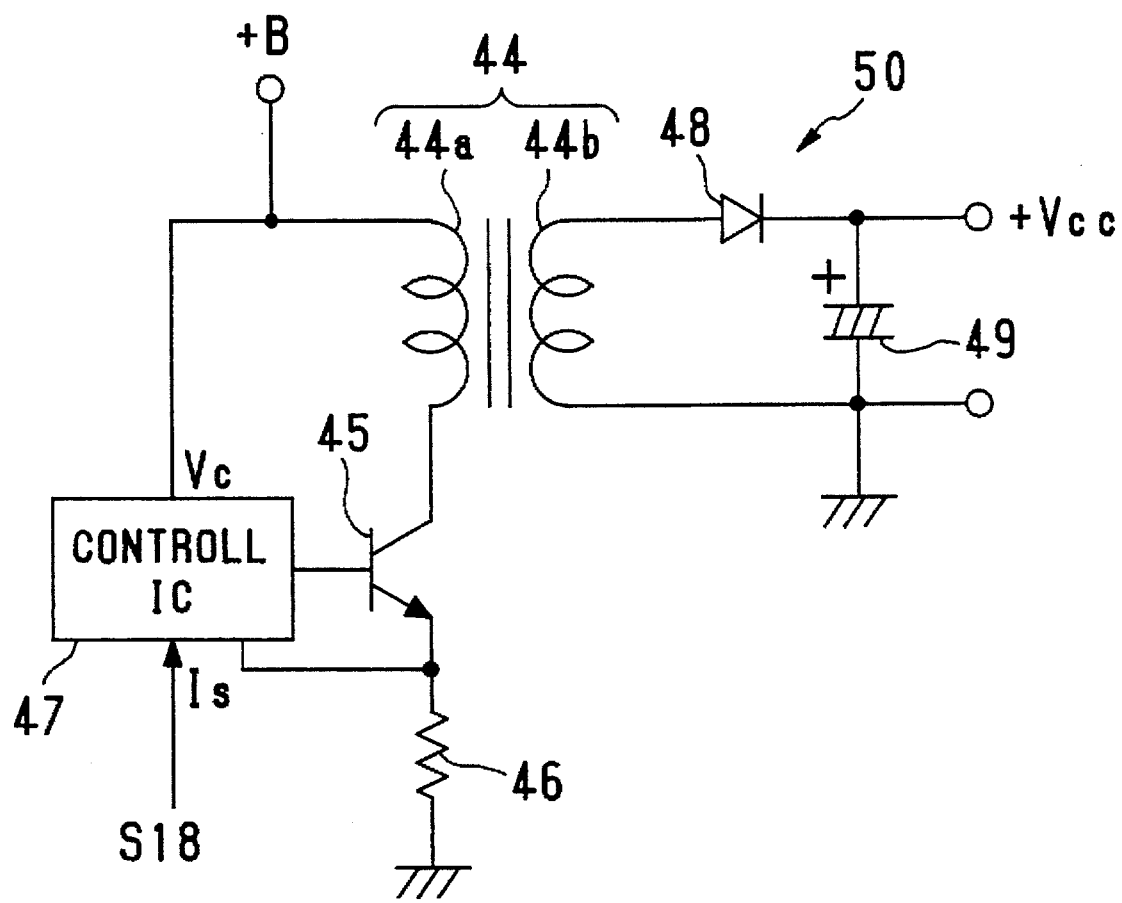
Figure 8:
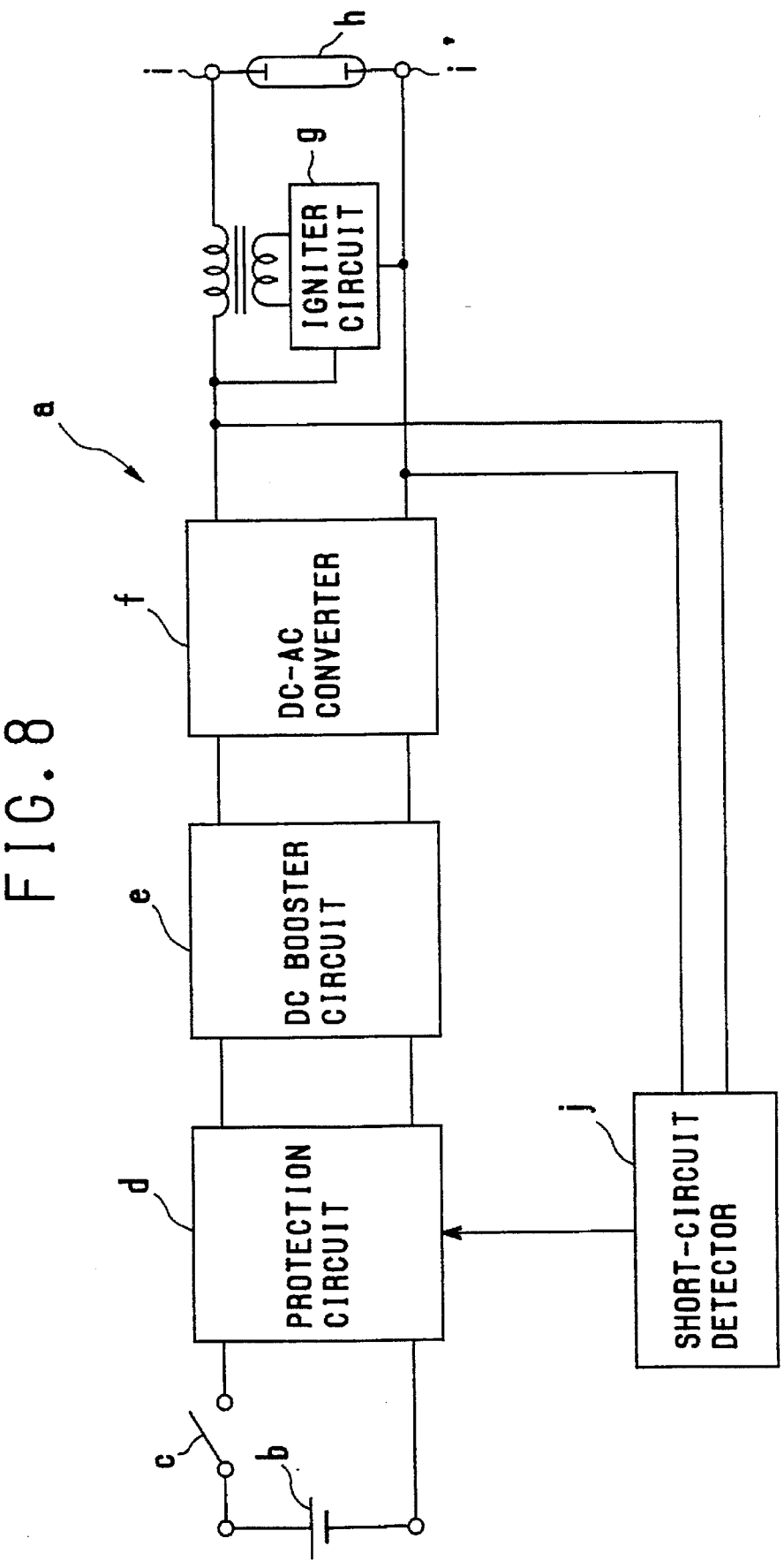
FIG. 8 is a block diagram showing an example of the structure of a conventional lighting circuit.
Figure 9:
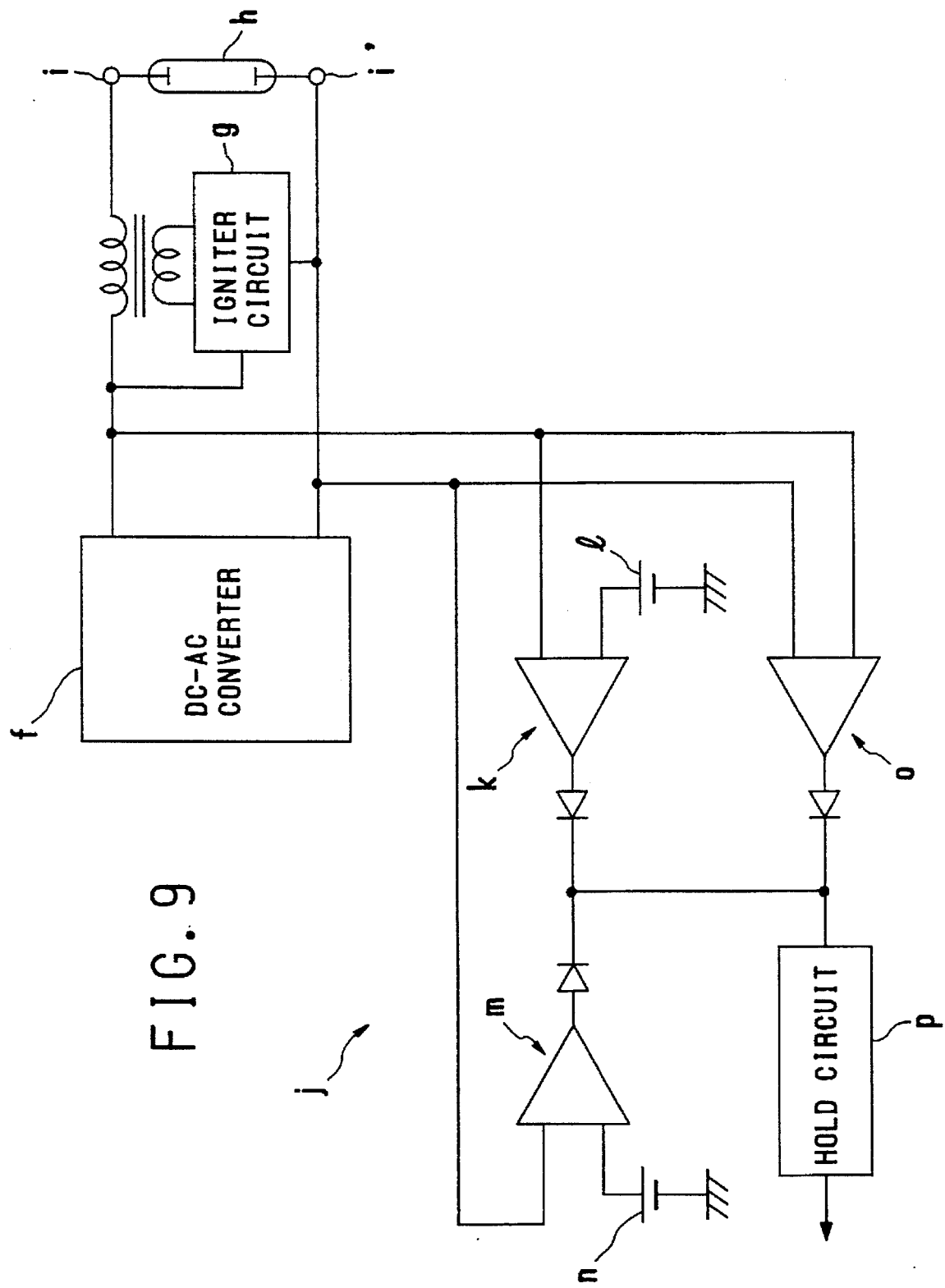
FIG. 9 is a block diagram showing a conventional short-circuit detector.

FIGS. 5 through 7 show a lighting circuit 1A according to the second embodiment of this invention.

The lighting circuit 1A for a discharge lamp of the second embodiment differs from the lighting circuit 1 for a discharge lamp of the first embodiment in that the second short-circuit detector 15C has filter means and power supply to the controller 12, etc. is stopped when short-circuiting is detected, thereby inhibiting the operation of the lighting circuit. Like or same reference numerals as used for the components of the first embodiment will be also used for the second embodiment to denote corresponding or identical portions, so that repeating their description is avoided.

FIG. 5 shows the structure of the lighting circuit 1A which is provided with a constant voltage supply 39 for producing a predetermined supply voltage based on the voltage (+B) from the battery 2. The supply voltage (+$V_{cc}$) obtained from the constant voltage supply 39 is supplied to the controller 12 and the control section and the like in the DC-AC converter 8. The constant voltage supply 39 is designed to serve as a protection circuit and to stop generating the supply voltage upon reception of a short-circuit detection signal sent via the hold circuit 18 from the short-circuit detectors 15A and 15C.

FIG. 6 exemplifies the structure of the second short-circuit detector 15C, which is designed to supply the voltage, obtained by dividing the output voltage of the DC booster circuit 7, to a high-pass filter 40 to pass a signal whose frequency is equal to or above a predetermined frequency.

More specifically, the output voltage of the DC booster circuit 7 is divided by the resistors 19 and 19' and the divided voltage is input to the high-pass filter 40 whose output is sent via the diode 17 to the hold circuit 18.

When short-circuiting occurs between the AC output terminal 10 or 10' and the ground, the output voltage of the DC booster circuit 7 becomes a square wave as mentioned earlier. Because the frequency of that square wave is previously known, however, the pass band of the high-pass filter 40 in the second short-circuit detector 15C is previously set to match that frequency, so that the H-level wave part of the square wave passes the high-pass filter 40 and activates the hold circuit 18 via the diode 17. When the DC booster circuit 7 is operating normally and is outputting a DC voltage, the DC output voltage of the DC booster circuit 7 is always cut by the high-pass filter, so that the output stays an L level.

As the high-pass filter 40, an active filter (multiple feedback circuit, control source circuit or the like) using an operational amplifier may be used. In the diagram, the high-pass filter 40 is so designed that the terminal voltage of the capacitor 22 is input to the inverting input terminal of an operational amplifier 43 via a resistor 41 and a capacitor 42.

The high-pass filter 40 may be replaced with a band-pass filter which should pass only a signal having a frequency lying within a predetermined range with the frequency of the square-wave voltage output from the DC booster circuit 7 as a reference when short-circuiting occurs. When a low-pass filter is to be used, for passing a signal of a frequency equal to or lower than a predetermined frequency, and an inverting circuit or the like should be provided to obtain an L-level signal when the DC voltage from the DC booster circuit 7 in the normal state passes the filter and to obtain an H-level signal when the square-wave voltage from the DC booster circuit 7 is blocked when short-circuiting occurs. Any circuit structure may be taken as long as it is possible to determine whether the output voltage of the DC booster circuit 7 is a DC voltage or a square-wave voltage.

FIG. 7 shows an example of the structure of the constant voltage supply 39, which takes the form of a fly-back DC-DC converter.

The battery voltage is supplied to one end of the primary winding, 44a, of a transformer 44, and the emitter of an NPN transistor 45 connected to the other end of the primary winding 44a is grounded via a resistor 46. The battery voltage is supplied to the power terminal ($V_c$) of a control IC 47 which performs the switching control of the transistor 45 whose base is supplied with a control signal from the control IC 47.

The control IC 47 is designed to be able to control the oscillation in accordance with a signal (S18) from the hold circuit 18 in such a way that when the signal S18 has an H level (i.e., when short-circuiting is detected), the oscillation is stopped. The emitter current of the transistor 45 is detected by the resistor 46 and is input to the current detecting terminal (IS) of the control IC 47, thereby effecting the current limitation.

The terminal voltage of the secondary winding, 44b, of the transformer 44 is output as the supply voltage (+$V_{cc}$) via a rectifier/smoothing circuit 50, which comprises a diode 48 and a capacitor 49.

When the lighting circuit 1A is operating normally, the control IC 47 controls the switching of the transistor 45 to generate a predetermined supply voltage which is in turn supplied to the controller 12 and other circuits. When short-circuiting is detected, the signal S18 sent via the hold circuit 18 to the control IC 47 the first or second short-circuit detector 15A or 15C has an H level, the oscillation of the control IC 47 is inhibited to stop generating the supply voltage. As a result, no power is supplied to the controller 12, etc., stopping the operation of the lighting circuit 1A.

It should be apparent from the above that according to this invention, one short-circuit detector detects that the DC voltage output from the DC power supply circuit changes to a square-wave voltage when short-circuiting occurs between one of the two AC output terminals and the ground. This structure require no special short-circuit detector for each AC output terminal, thus contributing to the reduction of the number of the required circuit components.

Further, according to this invention, a binary signal indicative of whether or not short-circuiting has occurred is obtained by comparing the first voltage level, obtained by detecting the output voltage of the DC power supply circuit or the voltage resulting from the division of that output voltage, with the second voltage level obtained by smoothing the first voltage level. This scheme can contribute to simplifying the circuit structure.

Furthermore, according to this invention, the occurrence of short-circuiting between one of the AC output terminals and the ground can be detected by using filter means to determine whether the output of the DC power supply circuit is in a DC form or has a square waveform. It is therefore possible to perform the detection of short-circuiting in accordance with the frequency of the square wave output from the DC power supply circuit or the amplitude change of that output by properly setting the pass band of the filter means.

Therefore, the present examples and embodiments are to be considered as illustrative and not restrictive and the invention is not to be limited to the details given herein, but may be modified within the scope of the appended claims.

What is claimed is:

1. A lighting circuit for a discharge lamp comprising:

a DC power supply circuit for boosting and/or decreasing a DC voltage;

a DC-AC converter for converting an output voltage of said DC power supply circuit into a square-wave AC voltage and supplying said AC voltage to a discharge lamp;

an abnormality detector for monitoring an output voltage of a DC booster circuit in said DC power supply circuit and an output voltage of said DC-AC converter to thereby detect an abnormality of said lighting circuit; and a protection circuit for inhibiting an operation of said lighting circuit or cutting off power supply to said discharge lamp when an abnormality is detected by said abnormality detector.

2. The lighting circuit according to claim 1, wherein said abnormality detector includes short-circuit detecting means for detecting a change of a DC voltage from said DC booster circuit to a square-wave voltage when short-circuiting between an AC output terminal and ground occurs, and said protection circuit inhibits said operation of said lighting circuit or cutting off power supply to said discharge lamp when short-circuiting between said AC output terminal and ground is detected by said shod-circuit detecting means.

3. The lighting circuit according to claim 2, wherein said short-circuit detecting means compares a first voltage level obtained by detecting said output voltage of said DC power supply circuit or a voltage-divided output obtaining by voltage-dividing said output voltage thereof with a second voltage level obtained by smoothing said first voltage level, thereby yielding a binary signal indicative of occurrence or non-occurrence of short-circuiting.

4. The lighting circuit according to claim 2, wherein said short-circuit detecting means has filter means for passing or blocking said square-wave voltage output from said DC power supply circuit when short-circuiting between said AC output terminal and ground occurs, and blocking or passing said DC voltage output from said DC power supply circuit when no short-circuiting occurs between said AC output terminal and ground, a binary signal indicative of occurrence or non-occurrence of short-circuiting is obtained in accordance with an output of said filter means.

5. The lighting circuit according to any of claim 2, wherein said short-circuit detecting means includes a first short-circuit detector for detecting short-circuiting between said AC output terminal and a second AC output terminal, and a second short-circuit detector for detecting short-circuiting between said AC output terminal and ground.

6. The lighting circuit according to any of claim 3, wherein said short-circuit detecting means includes a first short-circuit detector for detecting short-circuiting between said AC output terminal and a second AC output terminal, and a second short-circuit detector for detecting short-circuiting between said AC output terminal and ground.

7. The lighting circuit according to any of claim 4, wherein said short-circuit detecting means includes a first short-circuit detector for detecting short-circuiting between said AC output terminal and a second AC output terminal, and a second short-circuit detector for detecting short-circuiting between said AC output terminal and ground.

8. The lighting circuit according to claim 5, wherein said protection circuit includes:

a hold circuit for holding a power cutoff state until said lighting circuit is activated again; and a power cutoff relay circuit for stopping an operation of said lighting circuit in accordance with a signal output from said hold circuit.

9. The lighting circuit according to claim 6, wherein said protection circuit includes:

a hold circuit for holding a power cutoff state until said lighting circuit is activated again; and a power cutoff relay circuit for stopping an operation of said lighting circuit in accordance with a signal output from said hold circuit.

10. The lighting circuit according to claim 7, wherein said protection circuit includes:

a hold circuit for holding a power cutoff state until said lighting circuit is activated again; and a power cutoff relay circuit for stopping an operation of said lighting circuit in accordance with a signal output from said hold circuit.

11. The lighting circuit according to claim 5, wherein said second short-circuit detector includes:

two voltage-dividing resisters for voltage-dividing said output voltage of said DC booster circuit;

a comparator having positive and negative input terminals, a node between said voltage-dividing resisters being connected to said negative input terminal;

a parallel circuit of a Zener diode and a capacitor connected in parallel to one of said voltage-dividing resisters;

a diode having an anode connected to said negative input terminal of said comparator and a cathode grounded via two second resisters;

a capacitor connected in parallel to one of said second resisters, a terminal voltage of said capacitor being input to said positive input terminal of said comparator; and a pull-up resistor connected to an output terminal of said comparator.

12. The lighting circuit according to claim 6, wherein said second short-circuit detector includes:

two voltage-dividing resisters for voltage-dividing said output voltage of said DC booster circuit;

a comparator having positive and negative input terminals, a node between said voltage-dividing resisters being connected to said negative input terminal;

a parallel circuit of a Zener diode and a capacitor connected in parallel to one of said voltage-dividing resisters;

a diode having an anode connected to said negative input terminal of said comparator and a cathode grounded via two second resisters;

a capacitor connected in parallel to one of said second resisters, a terminal voltage of said capacitor being input to said positive input terminal of said comparator; and a pull-up resistor connected to an output terminal of said comparator.

13. The lighting circuit according to claim 7, wherein said second short-circuit detector includes:

two voltage-dividing resistors for voltage-dividing said output voltage of said DC booster circuit;

a comparator having positive and negative input terminals, a node between said voltage-dividing resistors being connected to said negative input terminal;

a parallel circuit of a Zener diode and a capacitor connected in parallel to one of said voltage-dividing resistors;

a diode having an anode connected to said negative input terminal of said comparator and a cathode grounded via two second resistors;

a capacitor connected in parallel to one of said second resistors, a terminal voltage of said capacitor being input to said positive input terminal of said comparator; and a pull-up resistor connected to an output terminal of said comparator.

14. The lighting circuit according to claim 4, wherein said filter means is a high-pass filter having an input terminal supplied with a voltage obtained by voltage-dividing said output voltage of said DC booster circuit, for passing a signal of a frequency equal to or higher than a predetermined frequency, an output of said high-pass filter being sent to said protection circuit.

15. The lighting circuit according to claim 14, wherein said high-pass filter is an active filter constituted of an operational amplifier.

16. The lighting circuit according to claim 4, wherein said filter means is a bandpass filter for passing a signal of a frequency lying within a predetermined range of a frequency of a square-wave voltage output from said DC booster circuit as a reference when short-circuiting between said AC output terminal and ground occurs.

17. The lighting circuit according to claim 4, wherein said filter means is a low-pass filter for passing a signal of a frequency equal to or lower than a predetermined frequency, and an inverting circuit is further provided for obtaining a low-level signal when said DC voltage from said DC booster circuit in a normal state passes and a high-level signal when a square-wave voltage from said DC booster circuit is blocked when short-circuiting between said AC output terminal and ground occurs.

18. The lighting circuit according to claim 1 wherein said abnormality detector detects short-circuiting between one AC output terminal and ground by detecting said output voltage of said DC booster circuit, and detects short-circuiting between AC output terminals by detecting said output voltage of said DC-AC converter.

19. A lighting circuit for a discharge lamp comprising:

a DC power supply circuit for boosting and/or decreasing a DC voltage;

a DC-AC converter for converting an output voltage of said DC power supply circuit into a square-wave AC voltage and supplying said AC voltage to a discharge lamp;

an abnormality detector for monitoring an output voltage of a DC booster circuit in said DC power supply circuit to thereby detect an abnormality of said lighting circuit, said abnormality detector including short-circuit detecting means for detecting a change of a DC voltage from said DC booster circuit to a square-wave voltage when short-circuiting between an AC output terminal and ground occurs; and a protection circuit for inhibiting an operation of said lighting circuit or cutting off power supply to said discharge lamp when short-circuiting between said AC output terminal and ground is detected by said short-circuit detecting means.

* * * * *